April 20, 1965 D. N. SHARMA 3,179,891

RADIO RECEIVER WITH SEPARABLE UTILITY CASE

Filed Oct. 10, 1962 3 Sheets-Sheet 1

INVENTOR.
DEVENDRA NATH SHARMA

BY Rupert J. Brady
ATTORNEY

April 20, 1965 D. N. SHARMA 3,179,891
RADIO RECEIVER WITH SEPARABLE UTILITY CASE
Filed Oct. 10, 1962 3 Sheets-Sheet 2
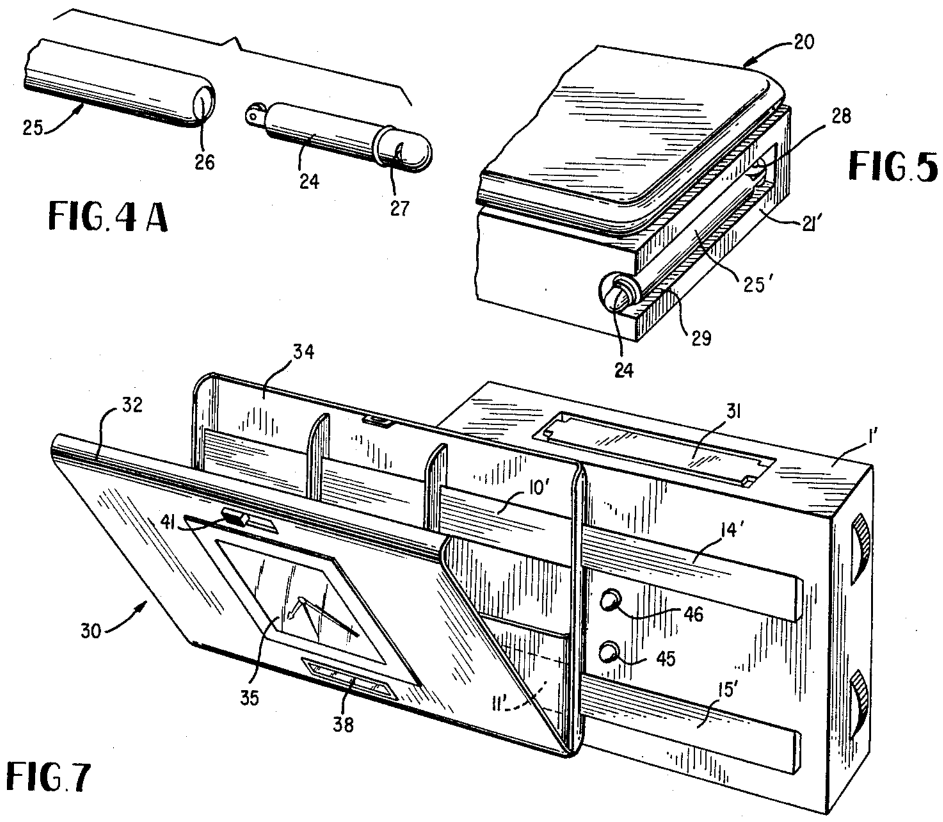
FIG. 4A, FIG. 5, FIG. 6, FIG. 7
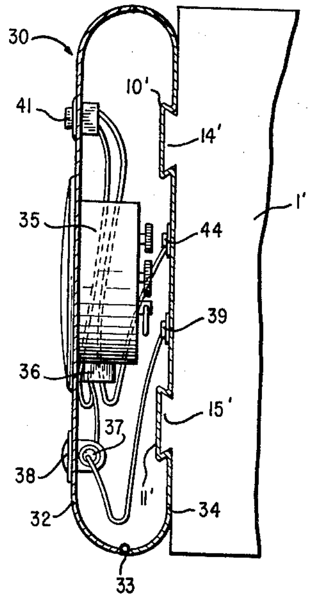
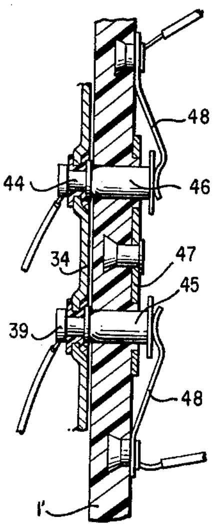
FIG. 8
INVENTOR.
DEVENDRA NATH SHARMA
BY Rupert J. Brady
ATTORNEY April 20, 1965 D. N. SHARMA 3,179,891

RADIO RECEIVER WITH SEPARABLE UTILITY CASE

Filed Oct. 10, 1962 3 Sheets-Sheet 3

INVENTOR.
DEVENDRA NATH SHARMA

BY Rupert J. Brady

ATTORNEY

United States Patent Office 3,179,891

Patented Apr. 20, 1965

3,179,891

RADIO RECEIVER WITH SEPARABLE UTILITY CASE

Devendra Nath Sharma, 22 Carroll House, Gloucester Terrace, London, England

Filed Oct. 10, 1962, Ser. No. 229,662

8 Claims. (Cl. 325—361)

This invention relates broadly to radio receivers of the miniaturized, transistorized type, and more particularly to such type radio receivers having a separate utility case connected thereto for use as a unit with the radio, and which is selectively separable therefrom to enable the radio receiver and utility case to be used separately. As well as other type utility cases, the invention provides for utility cases such as a cigarette case and lighter combination, lady's compact or cosmetic case, or a case having an alarm clock or the like therein for selective control of the radio receiver, connected to one face of the radio receiver case by means which will allow the two units to be easily disconnected from each other for separate use.

It is therefore an object of the present invention to provide a construction of miniaturized radio receiver case having a separately usable utility case detachably connected to one face thereof.

Another object of the invention is to provide a construction for detachably connecting a radio receiver case and separate utility case for use as separate units or as single units, in which the usefulness and appearance of the utility case is not appreciably changed when separately used and in which all protruding connecting means have been eliminated from the utility case.

Another object of the invention is to provide a construction for selectively joining a utility case and radio receiver case which enables the cases to be quickly and easily connected together and disconnected, and provides means whereby the cases can be joined together in only one manner relative to each other.

Another object of the invention is to provide a construction of miniaturized radio receiver case having novel means for concealing a cigarette lighter or the like therein.

A further object of the invention is to provide a construction for selectively connecting and disconnecting a radio receiver case and a utility case with novel means for completing an electrical circuit between the selectively separable cases.

Still a further object of the invention is to provide a construction of radio receiver case having a removable separately usable utility case which forms a grill for the radio speaker when the cases are connected as a unit.

Other and further objects of the invention reside in the cooperation between the utility case and the radio receiver when used as a unit, such as for energizing the radio when the utility case is open, and in the novel combination of various type utility cases with a radio receiver, such as a separate travel type clock which may be connected to the radio case to control the circuits therein, as set forth more fully in the specification hereinafter following by reference to the accompanying drawings, in which:

FIGURE 4A is an enlarged fragmentary perspective view showing the cigarette lighter removed from the antenna of FIG. 4;

FIGURE 5 is a fragmentary perspective view showing a modified form for mounting the antenna-lighter combination of FIG. 4 to the case of the radio receiver;

FIGURE 6 is a perspective view showing a utility case incorporating an alarm clock or the like for controlling the radio receiver circuit, with the utility case shown partly removed from connection with the case of the radio receiver;

FIGURE 7 is a vertical cross-sectional view, on an enlarged scale, partly in elevation and showing the manner in which the clock utility case is connected to the radio receiver;

FIGURE 8 is an enlarged fragmentary cross-sectional view showing the means for completing the electrical circuit between the clock utility case and the radio receiver circuit;

Figure 10:
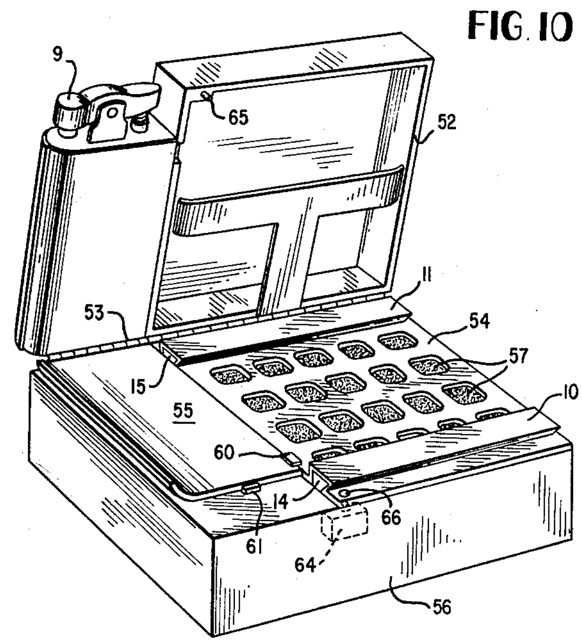
FIGURE 10 is a perspective view of a further modified form of utility case and radio receiver combination.
Figure 11:
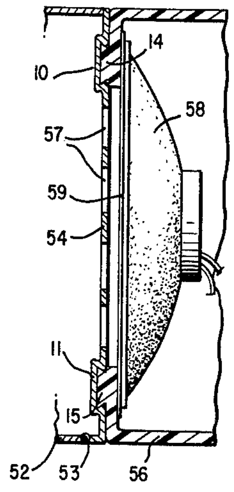
Figure 12:
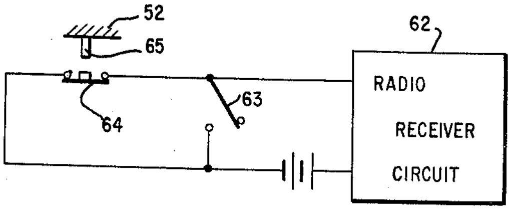

FIGURE 11 is a partial cross-sectional view showing the manner in which the utility case and radio receiver case of FIG. 10 are connected together and particularly showing the manner in which the utility case forms a protective grill for the radio speaker when the cases are connected as a unit; and FIGURE 12 is an electrical schematic block diagram showing the manner in which the radio receiver circuit of the combination shown in FIG. 10 is energized upon the opening of the utility case.

Since construction details or shape can be easily varied, the drawings have been shown in somewhat schematic form throughout, but the invention can easily be practiced from the constructions illustrated in the drawings.

Referring to the drawings in greater detail, a miniaturized radio receiver circuit of the transistorized type, including an associated loud-speaker, ferrite-type aerial, and a battery power supply is enclosed within radio receiver case 1, with the case being provided with protruding rotatable members 2 and 3, or the like, for turning the radio on and off, controlling the volume, and selecting the operating frequency of the radio receiver circuit in conventional manner. The case 1 may also be provided with a loud-speaker grill or opening, and an additional spare lid or cover used when the utility case is removed from receiver and external phone sockets and the like, which have not been illustrated as these are all conventional components of existing radio receiver cases.

Figure 1:
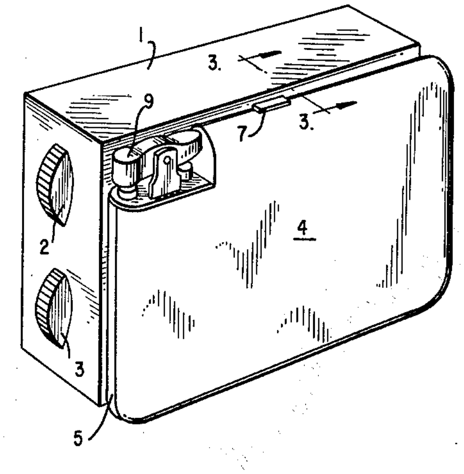
FIGURE 1 is a perspective view showing a utility case of the combination cigarette case and lighter type connected as a unit with a miniaturized radio case according to the invention.
Figure 3:
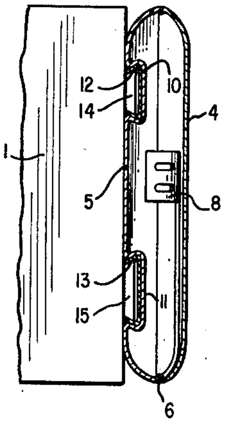
FIGURE 3 is a cross-sectional view partly in elevation, and taken substantially along line 3—3 of FIG. 1.
Figure 2:
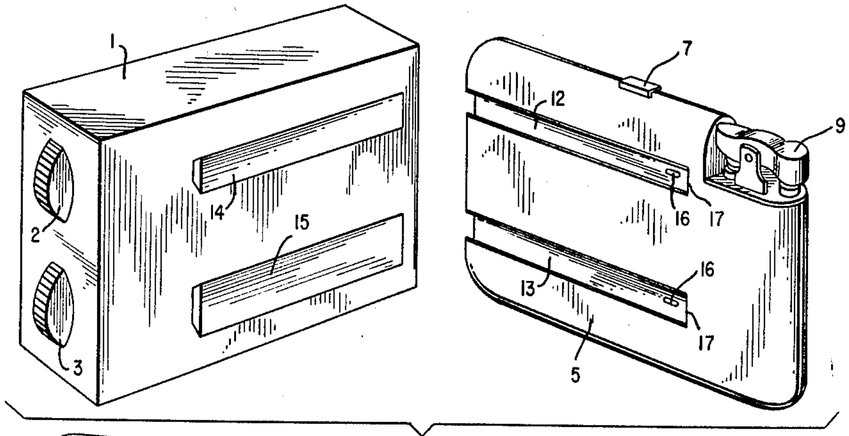
FIGURE 2 is a perspective view showing the radio receiver and utility case of FIG. 1 in separated positions for independent separate use, and particularly showing the means for connecting the two cases.

Referring to the form of invention shown in FIGS. 1–3A, a utility case of the combination cigarette storage and lighter type is illustrated as having front and back body portions 4 and 5 hingedly connected at 6 along one edge thereof, and joined along the opposite edge thereof by a suitable locking member 7, for example of the friction type. As in conventional combination cigarette and lighter cases, the present case provides a compartment for storage of cigarettes with the usual hinged retainer, and a compartment with a cigarette lighter 9 retained therein for access from outside the case. For safety purposes the lighting mechanism of lighter 9, cannot be, preferably, operated until the lid is in "open" position. The back portion 5 of the case is provided with a pair of longitudinally extending recessed portions or protrusions 10 and 11 extending from one side of the case or along the edges up to the portion or compartment containing the cigarette lighter. A pair of horizontally or vertically disposed channels 12 and 13 are connected within recessed portions 10 and 11 respectively, and are disposed to slidably receive, in dovetail fashion or frictionally under pressure, the rails 14 and 15 protruding from one face of radio receiver case 1 and which may be molded integrally therewith. The cooperating groups of members 14, 12, 10 and 15, 13, 11 may be provided with different widths as shown in FIGS. 2 and 3, to thus insure that the radio case and utility case are always mounted in the same manner relative to each other.

The body portions 4 and 5 of the utility case are normally constructed of metal, whereas the radio receiver case 1 may be molded of plastic or the like, with the rails 14 and 15 molded integrally therewith. In certain type constructions, the channels 12 and 13 may be eliminated and the recessed portions 10 and 11 formed directly as channels to receive the rails 14 and 15 in dovetail fashion or frictionally under pressure. Whichever construction is used, the cases are joined by sliding one with respect to the other in opposite directions, so that the rails 14 and 15 slip within the dovetail channels and are retained therein by engagement with the friction locking bosses 16 formed at the cigarette lighter end of channels 12 and 13, or recessed portions 10 and 11, with the ends 17 of the channels forming abutment stops for the rails for aligning the two cases.

Figure 3A:
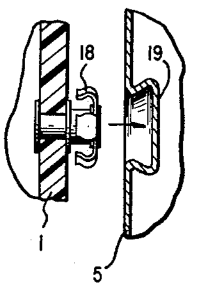
FIGURE 3A is a fragmentary cross-sectional view showing a modified form of means for connecting the two cases.

In FIG. 3A, I have shown a modified form of connecting means for joining the back body portion 5 of the utility case in abutment with radio receiver case 1. This modified connecting arrangement contemplates the use of snap fasteners or specially fabricated screws 18 connected to and protruding from radio receiver case 1 and being disposed to be received in cooperating locking recesses 19 formed in the back wall portion 5 of the utility case. Any appropriate number of snap fasteners may be used for connecting the two cases but a preferred arrangement utilizing two snap fasteners at one end of case 1 and a single snap fastener at the other end thereof insures that the cases will always be connected relative to each other in only one manner. In lieu of being separate members, the snap fasteners 18 may be of plastic material molded integrally with the radio case 1.

Figure 4:
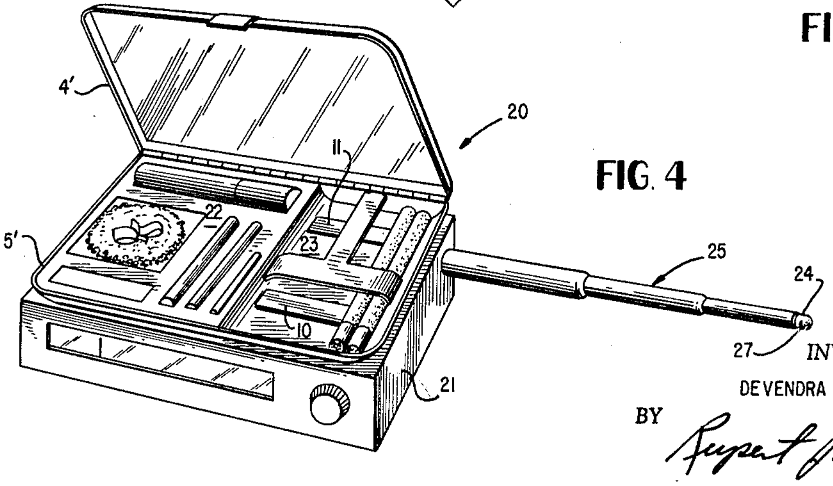
FIGURE 4 is a perspective view showing a lady's cosmetic case joined to a radio receiver according to the invention, and showing a cigarette lighter disposed in the end of an antenna extending from the radio receiver case.

Another form of the invention has been shown in FIGS. 4–5, wherein a lady's cosmetic case indicated generally at 20 is shown connected to the radio receiver case 21 in the same manner as illustrated in FIGS. 1–3. The cosmetic case 20 may consist of the hinged portions 4′ and 5′ with the portion 4′ providing a mirrored surface as shown, and the portion 5′ having a pair of longitudinally extending recessed portions 10 and 11 formed therein and providing a compartment indicated generally at 22 for holding cosmetics and the like and a compartment portion indicated generally at 23 for housing cigarettes. The utility case 20 may easily be arranged and compartmented for many other purposes other than housing cosmetics and cigarettes. Depending upon space requirements, the recessed portions 10 and 11 may extend the entire length of the hinged case portion 5′.

In this form of the invention since there is no provision for housing a cigarette lighter or the like in utility case 20, a small cigarette lighter indicated generally at 24 is removably received in the hollow end of antenna 25 which telescopically extends from the interior of radio receiver case 21 when the radio is in use. The telescopic antenna 25 is of conventional construction except for the provision of the opening 26 in the end thereof for receiving the lighter 24, and, therefore, the construction details have not been shown. A small indentation 27 is provided in one end of the lighter 24 to assist in removing the lighter from the end of antenna 25, as the lighter is held therein by friction engagement. It is to be understood that the lighter may be withdrawn from the antenna for use when the antenna is in either the extended position as shown in FIG. 4 or when it is telescopically collapsed within the case 21, since in the latter position, the head of the lighter carrying indentation 27 will protrude from the side of the case. In FIG. 4A, the lighter 24 has been shown removed from the end of the antenna.

A modified arrangement of the antenna of FIG. 4 has been shown in FIG. 5 wherein antenna 25′ of the telescopic type is connected through a pivot 28 to radio receiver case 21′ and the radio circuit enclosed therein, and is stored in a recessed edge portion 29 provided along one edge of the case when the antenna is not in use. The pivot 28 may be either of the hinge or ball and socket type, or a combination of both. The antenna is disposed so that the end of lighter 24 protrudes from the side of case 21′ when the antenna is in folded position so that the lighter may be withdrawn from the antenna when it is in retracted, as well as extended, position.

Figure 9:
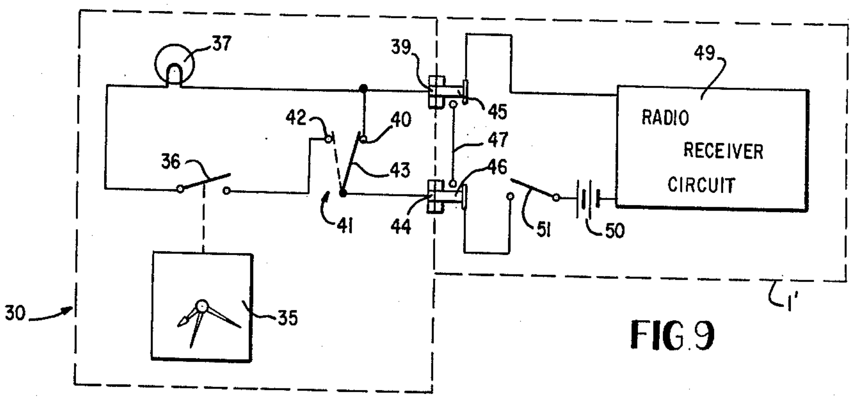
FIGURE 9 is an electrical schematic diagram of the control circuit extending between the clock utility case and the radio receiver circuit.

Another form of the invention has been shown in FIGS. 6–9 wherein a clock utility case 30 is shown slidably connected to radio receiver case 1′ having a flush disappearing carrying handle 31, by means of longitudinally extending recessed portions 10′ and 11′ engaging radio case rails 14′ and 15′ in dovetail fashion. In this form of the invention, the rails and recessed portions are shown extending the length of their respective cases. The clock case 30 comprises a lid portion 32 hinged at 33 to base portion 34 in which recesses 10′ and 11′ are formed. A clock 35 having a dial viewable from the outside of the case is carried by lid portion 32 and is disposed to selectively actuate alarm switch 36 connected to the clock in conventional manner. An alarm light 37, of the self-flashing type, is connected in electrical series with switch 36 and is connected to lid portion 32 so as to be viewable through a window 38 or the like carried thereby. One end of the series circuit of members 36 and 37 as shown in FIG. 9, is connected to fixed electrical contact 39 connected through the base portion 34 of the case and properly insulated therefrom, and to contact 40 of alarm cut-off switch 41. The other end of the series circuit is connected through contact 42 and movable contact 43 of the alarm cut-off switch, to fixed electrical contact 44 extending through base portion 34 and insulated therefrom in the same manner as contact 39. Thus the radio control electrical circuit in utility case 30 is brought out to the electrical contacts 39 and 44 on the back of the case. A cooperating pair of movable plunger type contacts 45 and 46 extend through the wall of radio case 1′ for registration with fixed contacts 39 and 44 when the utility case is slid onto the radio case for use of the two components as a single unit. Since the case 1′ is normally constructed of plastic or other insulation material, the plunger contacts 45 and 46 are insulated therefrom, and are normally urged outwardly of the case, as shown in FIG. 6, and into electrical contact with the shunt buss 47 carried inwardly of the case, by means of leaf springs 48 which complete the series circuit from plunger contact 45 through the radio receiver circuit 49, battery 50, on-off switch 51 and back to plunger contact 46. When the utility case is removed from radio case 1′, the plunger contacts 45 and 46 are moved outwardly by springs 48 so as to complete the electrical circuit between the plunger contacts through shunt buss 47 to thus enable energization of the radio receiver circuit to be completely controlled by on-off switch 51.

The outer ends of plunger contacts 45 and 46 are rounded or formed in such a manner that when utility case 30 is slid onto the rails of radio case 1′ contacts 45 and 46 are moved inwardly by the base portion 34 of the utility case to a position such as shown in FIG. 8, and when the cases are aligned fixed electrical contacts 39 and 44 are disposed in electrical contacting registration with contacts 45 and 46, respectively, as shown, to thus connect the circuit within utility case 30 in series with the circuit for turning on the radio receiver. In this position, the shunt connections between 45 and 46 through buss 47 is disconnected as shown. When using the clock control circuit to actuate the radio receiver, the clock 35 is set to actuate alarm switch 36 at a desired time while the radio on-off swich 51 is moved to the on position, and movable contactor 43 of alarm cut-off switch 41 is moved into contact with switch contact 42. At the prescribed time clock 35 closes alarm switch 36 thus energizing the radio receiver circuit 49 and simultaneously energizing alarm light 37 which periodically flashes due to the type of lamp used. As stated the flashing light is viewable through window 38 on the utility case. Movable contactor 33 of alarm cut-off switch 41 is movable between contacts 42 and 40 and in order to cut off the alarm light 37 but to retain the radio receiver circuit 49 in operating condition, contactor 43 is moved into contact with contact 40 thus extinguishing the alarm light and placing a shunt across the circuit to maintain the radio receiver 49 in operating condition.

A further form of the invention is shown in FIGS. 10–12 which disclose a combination cigarette storage and lighter case similar to that disclosed in FIGS. 1–3, and consisting of a lid portion 52 connected by hinge 53 to the separate base portions 54 and 55, with the case connected to rails 14 and 15 of radio case 56 by the longitudinally extending recessed channel portions 10 and 11 formed in hinged base portion 54 for engaging the rails in dovetail fashion. As shown in FIGS. 10 and 11 base portion 54 is provided with a plurality of apertures 57 for forming a grill for the electrostatic or electromagnetic loudspeaker 58 mounted in the case 56 in alignment with the grill. A fabric speaker covering 59 or an additional spare plastic lid is also provided to provide a fabric grill for the speaker or to serve as a lid for the radio receiver when the utility case is removed from connection with the radio case. The edge of the separate hinged base portion 55 provides an abutment stop for rail 15 when the two cases are slid together, and this base portion is provided with a tab 60 connected thereto and extending in overlying relation to base portion 54 interior of the case to insure that both separately hinged base portions 54 and 55 close simultaneously when the utility case is used separately from the radio case.

When the cases are connected together, the base portion 55 is retained flush against the radio receiver case by a suitable friction or click-in mechanism 61, and this portion of the base covers an access opening to the battery compartment of the radio receiver so that when it is necessary to change the battery, base portion 55 is lifted upwardly when the lid is in open position to thus allow easy removal of the battery therebeneath. The radio receiver circuit 62 within case 56 is provided with the usual type on-off switch 63 in series with the battery and is also provided with a switch 64 connected in shunt therewith, with spring biasing means normally urging the switch to closed position as shown schematically in FIG. 12. A protruding switch actuating lug 65 is carried by lid portion 52 and in the closed position this lug extends through aperture 66 in base portion 54 and into contact with the movable member of switch 64 to open the electrical circuit. With the on-off switch 63 in the off position as shown in FIG. 12, whenever lid portion 52 is opened, the movable member of switch 64 is released by lug 65 thus closing the electrical circuit from the battery to the radio receiver circuit to turn on the radio. On-off switch 63 connected in shunt with switch 64 and carried by the radio case allows the radio receiver circuit 62 to be energized whether the lid portion 52 is open or closed. Thus with this basic circuit the radio receiver is turned on when lid 52 is opened and is turned off when the lid is closed.

When the body of the utility case is constructed of metal, the entire case or the portion thereof constructed of metal may be advantageously utilized as an aerial screen or counterpoise. In the forms of the invention where a cigarette lighter is carried in the utility case, it is to be understood that the lighter is easily removable from the case in the usual manner for refilling with lighter fluid and for general service.

While I have described my invention in certain preferred embodiments, it is realized that modifications may be made and I desire that it be understood that no limitations upon my invention are intended other than may be imposed by the scope of the appended claims.

What I claim as new, and desire to secure by Letters Patent of the United States, is as follows:

1. A radio receiver and separable independently usable utility housing combination comprising: a generally rectangular radio receiver housing having a pair of side surfaces, a generally rectangular utility housing having a pair of side surfaces, one side surface of said utility housing hingedly connected to provide a utility compartment in said utility housing, one side surface of said radio receiver housing and the other side surface of said utility housing disposed in overlying relation and being substantially coextensive with each other, a pair of spaced rail members of different widths extending from one of the overlying side surfaces, and a pair of longitudinally extending recessed portions having widths corresponding to said rail members formed in the opposite overlying side surface and slidably engaging said corresponding pair of rail members to connect said housings as a unit in overlying predetermined relation relative to each other.

2. A device as set forth in claim 1, including outwardly extending bosses formed in said pair of longitudinally extending recessed portions and frictionally engaging said pair of rails to prevent relative movement of the housings when connected as a unit.

3. A device as set forth in claim 1 in which said rails and said recessed portions are positioned inwardly of the longitudinal edges of the side surfaces, and said rails and said recessed portions correspondingly terminate inwardy of one end of the respective housings, individual stop surfaces connected in the inwardly terminating ends of said recessed portions formed in the side surface, and said individual stop surfaces disposed in abutment with the corresponding inwardly terminating ends of said rails.

4. A device as set forth in claim 1 in which the overlying side surfaces of said radio receiver housing and utility housing are connected in sliding engagement substantially throughout the lengths thereof.

5. A combination radio receiver and separable independently usable case comprising, a radio case, a pair of rail members connected to one side surface of said case in spaced relation inwardly of the surface edges, a radio receiver circuit including a battery power supply connected in said radio case, spring biased switch means connected in the electrical circuit of said radio receiver circuit and said power supply and movably connected through said one side surface of said radio case, a second case, said second case having a cover hingedly connected to a back portion, a pair of individual recessed portions formed in said back portion for slidably engaging said pair of rail members for connecting said cases as a unit in overlying relation with the one side surface and back portion coextensively disposed while permitting separation thereof for independent use, said spring biased switch means extending in the path of said back portion and adapted to be moved thereby when said second case is slidably connected to said radio case to automatically open the electrical circuit in said radio case, and electrical control means connected in said second case and terminating in contact means extending through said back portion for registration with said spring biased switch means when said cases are slidably connected as a unit in overlying relation to complete the electrical circuit between said control means and said radio circuit for control by said control means in said second case.

6. A combination radio receiver and separable independently usable case as set forth in claim 5 in which said electrical control means includes a clock operated switch and alarm means connected in series with said clock operated switch for simultaneous energization with said radio receiver circuit upon closing of said clock operated switch.

7. A device of the character described, comprising a radio case, a selectively operable radio circuit connected therein including a loudspeaker, an opening in one side surface of said case for said loudspeaker, a pair of rail members of different widths connected to said one side surface of said radio case inwardly of the edges thereof on either side of the loudspeaker opening, a second case, said second case having a front portion hingedly connected to a back portion, a pair of recessed portions of different widths corresponding to the rail widths formed in said back portion for selectively slidably engaging said rail members for connecting said cases as a unit in overlying coextensive relation while permitting slidable separation thereof for independent use, a grill for said loudspeaker formed in said back portion of said second case overlying said loudspeaker opening when the cases are assembled as a unit, switch means connected to said radio case and electrically connected to operate said radio circuit, and switch operating means carried by said front portion of said second case and extending into contact with said switch means when the front portion of said second case is closed to de-energize the radio circuit and to energize the same upon opening of said front portion whereby the second case is connected to overlie the loudspeaker opening of the radio case without affecting loudspeaker efficiency.

8. A device as set forth in claim 7 in which said back portion includes a separate portion of said second case hinged to said front portion adjacent the loudspeaker grill in side-by-side relation, and another opening in said radio case adjacent said loudspeaker opening covered by said separate portion.

References Cited by the Examiner

UNITED STATES PATENTS

| | | | |
|---|---|---|---|
| 1,209,759 | 12/16 | Richter | 206—38 |
| 1,341,295 | 5/20 | Burtis | 206—38 |
| 2,032,094 | 2/36 | Le Voci | 206—38 |
| 2,771,559 | 11/56 | Montmeat | 325—355 |
| 2,771,560 | 11/56 | Creiman | 325—355 |
| 2,878,375 | 3/59 | Schachtel | 325—352 |

DAVID G. REDINBAUGH, *Primary Examiner.*